Dec. 30, 1958  J. J. POTTER  2,866,200
MACHINES FOR SECURING HOOKED BELT-FASTENERS
Filed March 29, 1957  3 Sheets-Sheet 3

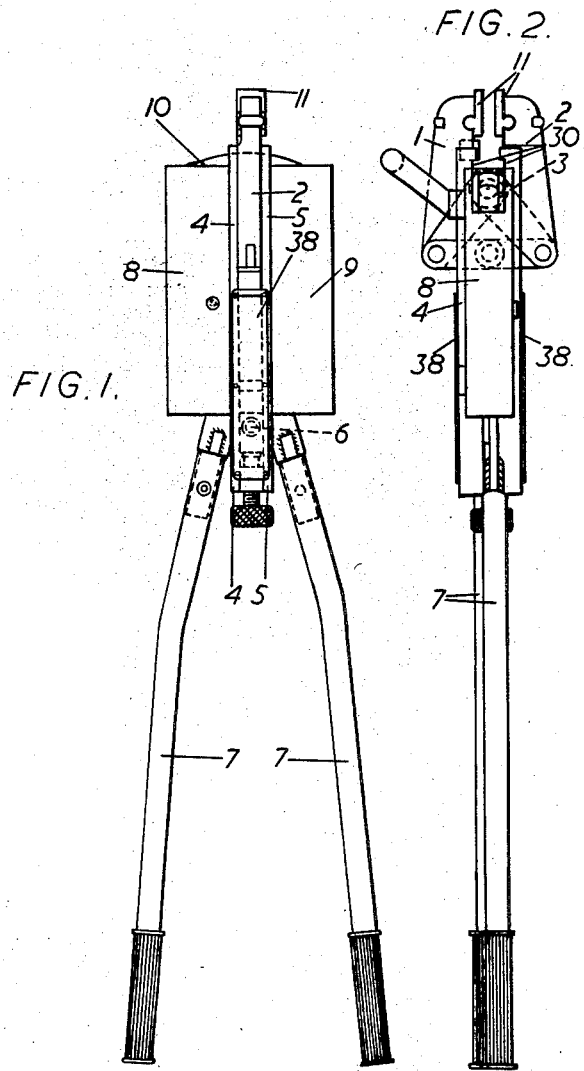

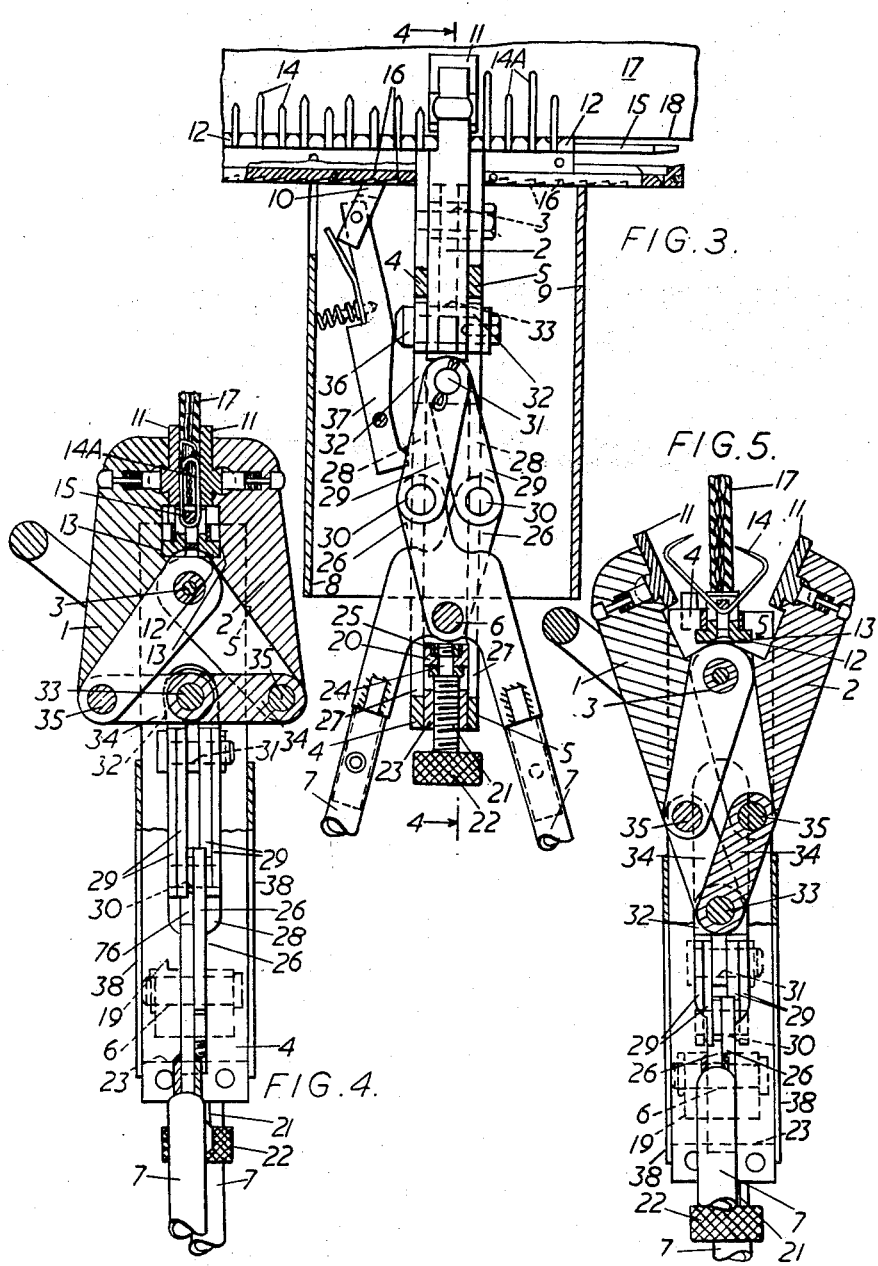

Inventor
John James Potter
By
Watson, Cole, Grindle & Watson
Attorneys

United States Patent Office 2,866,200
Patented Dec. 30, 1958

2,866,200

MACHINES FOR SECURING HOOKED BELT-FASTENERS

John J. Potter, Sheffield, England, assignor to Hayden-Nilos Limited, Sheffield, England Application March 29, 1957, Serial No. 649,431

Claims priority, application Great Britain July 17, 1956

3 Claims. (Cl. 1—49.4)

This invention relates to machines for securing hooked belt fasteners of the type in which a pair of pivoted jaws is adapted to be closed on to open hooks positioned along the end of a driving or conveyor belt, for successive hooks or groups of hooks to be clinched in the belt end, ready for linking to another belt end similarly provided with hooks.

The thickness of belts to be fastened may vary substantially. Thus, a conveyor belt for use at the coal face of a mine may be thinner than the belt of a gate or trunk conveyor. When, as is generally advantageous, the operating means for the jaws move over a fixed range from fully open to fully closed position, a jaw gap suitable for applying the clinching pressure to a thicker belt would be too big for use with a thinner belt, and a jaw gap suitable for a thinner belt would not apply sufficient pressure in the case of a thicker belt. Accordingly, detachable cheeks or anvils of different thickness have been provided on the jaws to enable a machine to deal with different belt thicknesses by interchanging the cheeks.

The object of the present invention is to provide for an adjustment of the jaws about their pivots to provide a gap covering a range of belt thicknesses, thus ensuring correct clinching pressure for any belt thickness at each movement of the operating means, and making it unnecessary to change the cheeks for a change of belt thickness.

According to the present invention, a machine for securing hooked belt fasteners to a belt comprises a pair of two-armed jaws pivoted to a frame, the forward ends of the jaws providing a gap to be closed on to a belt the end of which is inserted into the gap, and on to open fastening hooks positioned along the belt end, toggle links connecting the rearward ends of the jaws and pivoted to each other, an abutment in the frame rearwardly of the toggle links, a sliding member adjustably supported by and in relation to the abutment, and jaw-operating means connected between the sliding member and the common pivot of the toggle links.

The range of movement of the jaw-operating means is effective from the position to which the sliding member is adjusted in relation to the abutment on the frame, and produces substantially the same closing movement of the forward ends of the jaws whatever that position, but the nearer the abutment is adjusted towards the jaws, the closer is the initial gap setting of the forward ends of the jaws, because the common pivot of the toggle levers undergoes a similar adjustment, and the closer the gap when the full clinching pressure is applied.

As applied to a hand-operated machine using hand levers with toggle link connection between themselves and the common pivot of the toggle links between the jaws, the levers are pivoted to the sliding member, so that they, and their toggle links, are moved towards and away from the jaws as the sliding member is adjusted, in readiness for the full operating movement of the levers at whatever the gap to which the forward ends of the jaws are correspondingly adjusted. The adjustment of the sliding member may be simply effected by a screw passing through the abutment, a knurled or like head of the screw being accessible at the rear of the abutment between the handle ends of the levers.

Like adjustment may be provided where the operating means include a cam, hand- or power-operated, for moving the toggle links connecting the jaw.

The invention will be described in greater detail with respect to the accompanying drawings, which show it applied to a machine in which movement of the operating means actuates a ratchet to engage a rack provided on a comb bar in transverse sliding engagement with the frame carrying the jaws, so that the jaws traversing along the bar after each clinching operation as part of the simple operation of the operating means alone.

In the drawings:

Figure 1 is a plan view of the jaw unit provided with means for adjusting the gap of the jaws;

Figure 2 is a side elevation of Figure 1, showing the jaws closed;

Figure 3 is an enlarged part-sectional view of the jaw end of Figure 2, showing toggle mechanism and adjusting mechanism for the jaws;

Figure 4 is a side elevation of Figure 3, taken partly in section on the line 4—4; and Figure 5 corresponds to Figure 4, but shows the jaws open.

Figure 6:
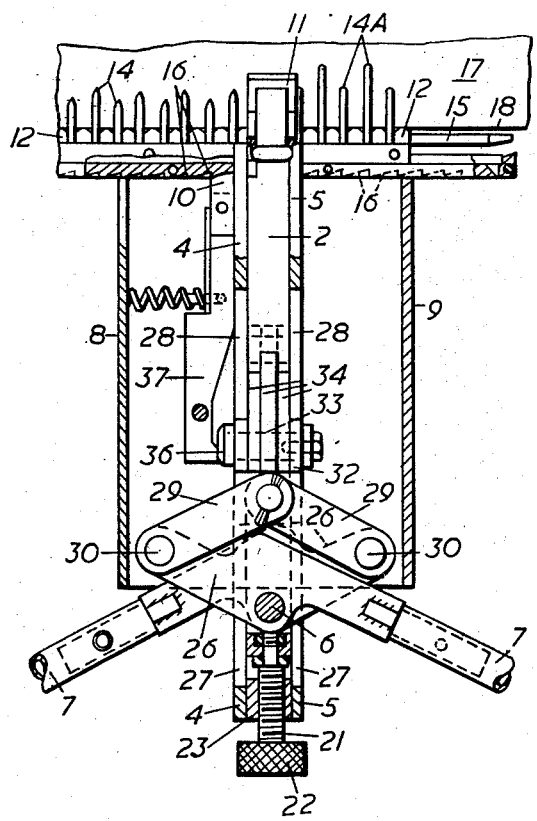
Figure 6 corresponds to Figure 3 but shows the toggle mechanism in jaw-open position.

In the jaw unit as shown in Figures 1 and 2, jaw levers 1, 2 are mounted on a common pivot 3 between side plates 4, 5 of a frame. On a pivot 6 between the plates 4, 5 are pivoted two handles 7 by which the jaw levers 1, 2 are operated. Two side casings 8, 9 provide for the movement of toggle mechanism (to be described below) and the casing 8 also contains a pawl 10, which, like the levers 1, 2 protrudes beyond the casing. The levers 1, 2 are provided with interchangeable hardened cheeks 11, which approach each other when the handles 7 are closed (Figures 2 and 4) and open when the handles are open (Figure 5).

Figures 3, 4, and 5 show a separate comb bar 12 lying across the end of the casing 8 from which the pawl 10 protrudes. The comb bar 12 engages slots 13 (Figure 5) in the ends of the plates 4, 5 and continues across the end of the casing 9. Open hooks 14 are held in the comb bar by a securing rod 15 and are brought between the jaw cheeks 11 by the engagement of the pawl 10 with rack teeth 16 in the face of the bar next to the casings 8, 9. A belt 17 is inserted between the cheeks 11 with its edge 18 against the comb bar 12, and when the cheeks 11 are closed they force the pointed ends of the hooks 14 through the belt 17 and flatten the sides of the hooks against the faces of the belt, as shown at 14A.

Figure 4 shows the cheeks 11 closed on to a belt 17 of the minimum thickness, i. e. the cheeks 11 have been brought as near to each other as the machine permits, and full pressure has been applied to the hooks 14 by bringing the handles 7 to their nearest approach to each other. The pressure applied by the cheeks 11 is very powerful, because of toggle mechanism connecting the handles 7 with the jaw levers 1, 2.

The pivot 6 for the handles 7 is carried in a block 19 that slides between the plates 4, 5 to a limit in one direction determined by a stop 20 also slidable between the plates 4, 5 and adjusted by means of a screw 21 with a knurled head 22. The screw 21 is threaded through an abutment 23 secured between the plates 4, 5, and a stem 24 of the screw passes freely through the stop 20, to which it is secured by a nut 25. Short arms 26 of the handles 7 pass through slots 27 in the plates 4, 5, which slots widen at 28 for the passage of pairs of toggle links 29 pivoted at 30 to the arms 26. The links 29 have a common pivot 31 on a slider 32 movable along the slots 28 and a transverse pivot 33 on the slider 32 is connected by toggle links 34 to pivots 35 on the inner ends of the jaw levers 1, 2. A projecting end 36 of the pivot 33 actuates a lever 37 carrying the pawl 10 as the pivot 33 slides along the slots 28.

The powerful leverage exerted by the handles 7 on their short arms 26 is transmitted by the toggle links 29 into strong pressure on the pivot 33 towards the pivot 3; and as the pivot 33 brings the toggle links 34 from the position of Figure 5 to the position of Figure 4, the inner ends of the jaw levers 1, 2 are forced outwards, to close the cheeks 11 with very high pressure on to the belt 17 in the final stages of clinching the hooks, as at 14A.

The thrust of the toggle links 29 on the pivot 31 of the slider 32 is opposed by the thrust of the block 19 (carrying the pivot 6) as the block bears on the adjustable stop 20. If the stop 20 is brought nearer to the abutment 23 by screwing the screw 21 further out of the abutment, the toggle links 29 reach their fully closed position (Figure 3) before the pivot 33 has advanced to the position shown in Figures 3 and 4, i. e., before the ends of the jaw levers 1, 2 carrying the cheeks 11 have approached as closely as shown in Figure 4, and before the inks 34 have reached the "in-line" position also shown in that figure. Consequently, a thicker belt 17 placed between the open cheeks 11 has the full pressure of the cheeks applied to its faces when the handles 7 have been fully closed, even though the cheeks 11 are not then as near to each other as in the case of the thinner belt shown in Figure 4.

The full range of adjustment of the stop 20 by the screw 21 provides for immediate variation from the minimum gap between the cheeks 11 (corresponding to the belt thickness) shown in Figure 4 to the maximum gap required for the thickest belt with which the machine can be used.

Cover plates 38 between the edges of the plates 4, 5 serve to keep foreign matter from the sliding block 19 carrying the pivot 6.

By its simple provision for adjustment of the gap, with negligible addition to the size of the jaw-unit and the number of components used, the invention contributes in valuable manner to the versatility of belt-fastening machines, and is particularly useful in its application to the light-weight machine comprising separate jaw unit and comb bar as described in detail above.

What I claim is:

1. A machine for securing hooked belt fasteners to a belt comprising a pair of two-armed jaws pivoted to a frame, the forward arms of the jaws providing a gap to be closed on to a belt the end of which is inserted into the gap, and on to open fastening hooks positioned along the belt end, toggle links connecting the rearward arms of the jaws and pivoted to each other, an abutment in the frame rearwardly of the toggle links, an adjusting screw passing through the abutment, a stop on the screw, a sliding member adjustably supported by the stop, and jaw-operating means connected between the sliding member and the common pivot of the toggle links.

2. A machine for securing hooked belt fasteners to a belt comprising a pair of two-armed jaws pivoted to a frame, the forward arms of the jaws providing a gap to be closed on to a belt the end of which is inserted in the gap and on to open fastening hooks positioned along the belt end, toggle links connecting the rearward arms of the jaws and pivoted to each other, an adjustable stop and a fixed abutment both in the frame rearwardly of the toggle links, an adjusting screw passing through the abutment to position the stop, a sliding member supported by the stop and jaw operating means connected between the sliding member and the common pivot of the toggle links.

3. A machine for securing hooked belt fasteners to a belt comprising a pair of two-armed jaws pivoted to a frame, the forward arms of the jaws providing a gap to be closed on to a belt the end of which is inserted in the gap and on to open fastening hooks positioned along the belt end, toggle links connecting the rearward arms of the jaws and pivoted to each other, an adjustable stop and a fixed abutment both in the frame rearwardly of the toggle links, an adjusting screw passing through the abutment to position the stop, a sliding member supported by the stop and a pair of handles pivoted on the sliding member, with the screw accessible between the handles, the handles presenting short arms towards the jaws, together with further toggle links connecting the short arms of the handles to the common pivot of the toggle links to the rear of the jaws.

References Cited in the file of this patent

UNITED STATES PATENTS

| 1,356,882 | Pendleton | Oct. 26, 1920 |
| 1,893,901 | McGregor | Jan. 10, 1933 |

FOREIGN PATENTS

| 459,330 | Great Britain | Jan. 6, 1937 |